United States Patent [19]

Oshiage

[11] Patent Number: 4,653,621
[45] Date of Patent: Mar. 31, 1987

[54] CONTROL SYSTEM FOR AUTOMATIC CLUTCH

[75] Inventor: Katsunori Oshiage, Yokohama, Japan

[73] Assignee: Nissan Motor Co., Ltd., Yokohama, Japan

[21] Appl. No.: 731,019

[22] Filed: May 6, 1985

[30] Foreign Application Priority Data

May 7, 1984 [JP] Japan .............................. 59-65570[U]

[51] Int. Cl.⁴ ........................ F16D 43/28; B60K 41/28
[52] U.S. Cl. .............................. 192/0.032; 192/0.052; 192/0.076; 192/0.092; 192/0.096
[58] Field of Search ................. 192/0.03, 0.032, 0.044, 192/0.052, 0.076, 0.092, 0.096

[56] References Cited

U.S. PATENT DOCUMENTS

| | | | |
|---|---|---|---|
| 3,237,734 | 3/1966 | Jania | 192/0.032 |
| 3,862,676 | 1/1975 | Schall | 192/0.032 |
| 4,542,665 | 9/1985 | Yamamuro et al. | 192/0.076 X |

FOREIGN PATENT DOCUMENTS

| | | | |
|---|---|---|---|
| 130794 | 1/1985 | European Pat. Off. | 192/0.032 |
| 58-47626 | 3/1983 | Japan. | |

Primary Examiner—Rodney H. Bonck
Assistant Examiner—Richard M. Lorence
Attorney, Agent, or Firm—Schwartz, Jeffery, Schwaab, Mack, Blumenthal & Evans

[57] ABSTRACT

A control system for automatic clutch is disclosed wherein a clutch torque is detected and the engagement of the clutch is controlled such that the detected clutch torque is brought into agreement with a creep clutch torque when a vehicle is under a pre-start-up operating condition and into agreement with a target clutch torque determined for engine operating condition when the vehicle is not under the pre-start-up operating condition.

4 Claims, 5 Drawing Figures

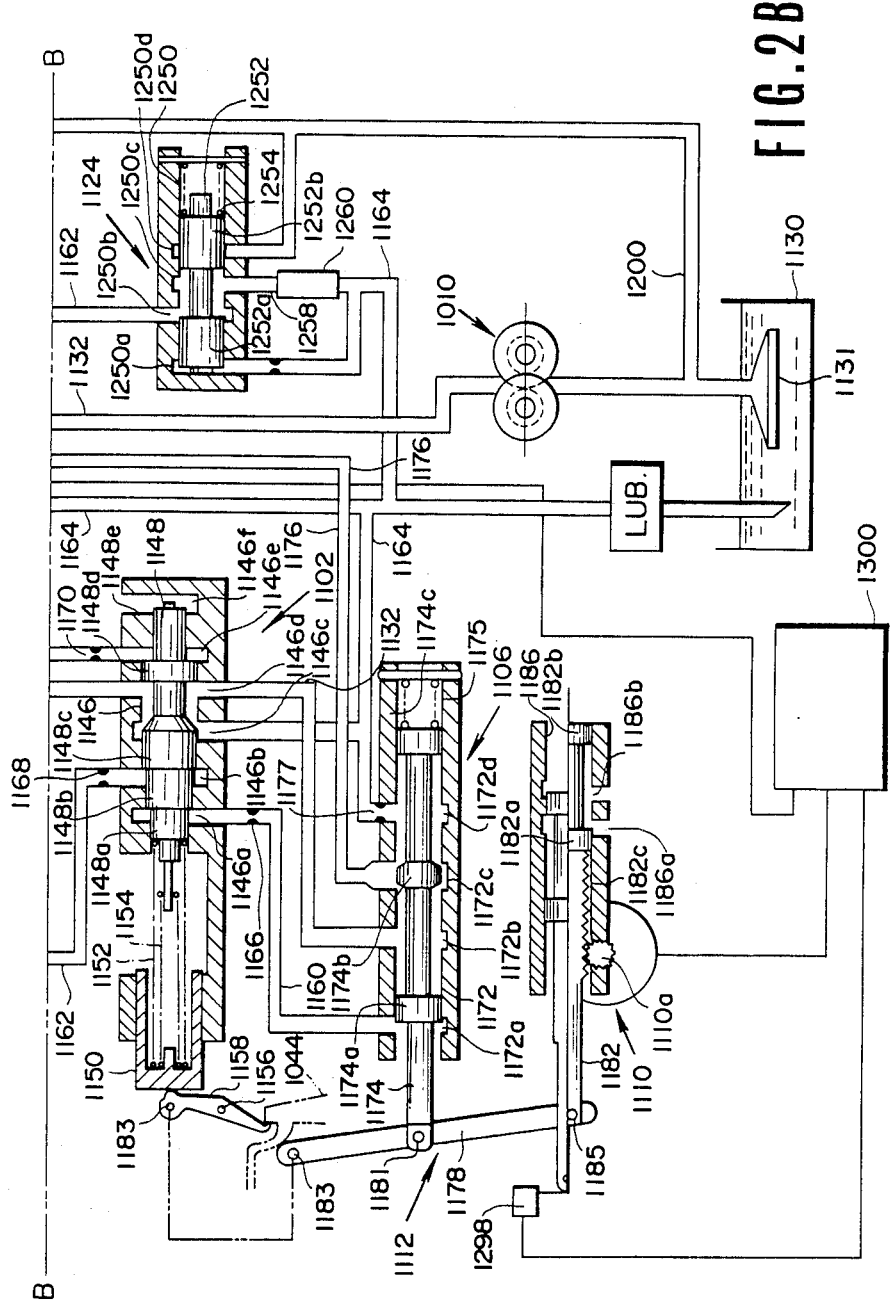

CONTROL SYSTEM FOR AUTOMATIC CLUTCH

REFERENCE TO RELATED APPLICATIONS

Reference is made to the following co-pending U.S. patent applications which are commonly assigned to the assignee of the present application:

U.S. Ser. No. 489,600, filed Apr. 28, 1983 now U.S. Pat. No. 4,579,021, issued Apr. 1, 1986 (corresponding to published EP No. 0 093 413)

U.S. Ser. No. 543,838, filed Oct. 20, 1983, now U.S. Pat. No. 4,576,265, issued Mar. 18, 1986 (corresponding to EP No. 83 110 546.5)

U.S. Ser. No. 544,066, filed Oct. 20, 1983, now U.S. Pat. No. 4,583,627, issued Apr. 22, 1986 (corresponding to EP No. 83 110 543.2)

U.S. Ser. No. 543,840, filed Oct. 20, 1983 now U.S. Pat. No. 4,542,665, issued Sept. 24, 1985 (corresponding to EP No. 83 110 545.7)

U.S. Ser. No. 610,795, filed May 16, 1984 (corresponding to EP No. 84 105 648.4).

BACKGROUND OF THE INVENTION

The present invention relates to a control system for an automatic clutch.

Japanese patent application provisional publication No. 58-47626 discloses a control system for an automatic clutch. According to this known control system, engine output torque is determined by retrieving stored data against engine speed and induction manifold vacuum which are detected, and clutch transmission capacity is controlled in response to engine output torque determined. Controlling the clutch transmission capacity in response to the engine output torque provides good running of a vehicle without any substantial vibrations, but it is not satisfactory in providing smooth start-up operation of the vehicle. Under a condition where a vehicle is at a standstill with an engine idling and a clutch released to interrupt flow of engine output torque to a transmission that follows the clutch, there occur substantial shocks upon engagement of the clutch if the engagement of the clutch is controlled in response to the engine output torque alone due mainly to the occurrence of backlash in the transmission and driving gears that follow.

SUMMARY OF THE INVENTION

An object of the present invention is to provide a control system for an automatic clutch which provides shockless start-up operation of a vehicle.

According to the present invention, a control system for an automatic clutch for a vehicle comprises:

detector means for detecting engine operating condition;

detector means for detecting whether or not the vehicle is under a predetermined pre-start-up operating condition in which the vehicle is ready to begin operator commanded movement and generating a pre-start-up operating condition indicative signal when the vehicle is under said predetermined pre-start-up operating condition;

means responsive to the presence of said pre-start-up operating condition indicative signal for determining a pre-start-up target clutch torque and generating a pre-start-up target clutch torque indicative signal;

means responsive to the absence of said pre-start-up operating condition indicative signal for determining an after-start-up target clutch torque for the engine operating condition detected and generating an after-start-up target clutch torque indicative signal;

means for detecting an actual clutch torque transmitted by the automatic clutch and generating an actual clutch torque indicative signal; and means for controlling the engagement of the automatic clutch such that said actual clutch torque indicative signal is brought into a predetermined relationship with one of said pre-start-up target clutch torque indicative signal and said after-start-up target clutch torque indicative signal.

BRIEF DESCRIPTION OF THE DRAWINGS

FIGS. 2A and 2B, when combined, illustrate a hydraulic control system, including a control system for the automatic clutch;

DESCRIPTION OF THE EMBODIMENT

Referring to the accompanying drawings, an embodiment of a control system for an automatic clutch according to the present invention is described. Although in this embodiment, the invention is applied to hydraulic forward and reverse clutches 1004 and 1024 of a continuously variable transmission, the invention may be applied to any forward or reverse clutch of any other type of transmission.

Figure 1:
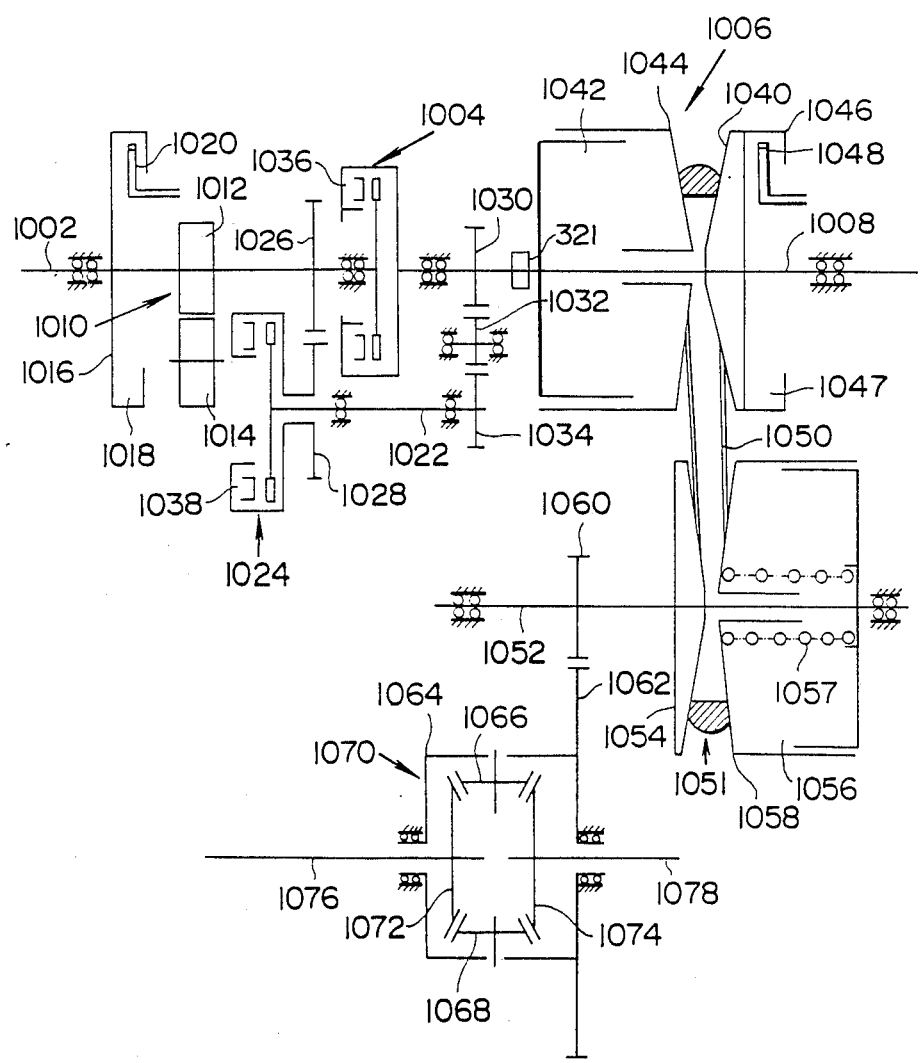
FIG. 1 is a diagrammatic view of an automatic clutch and a transmission mechanism of a continuously variable transmission.
Figure 2A:
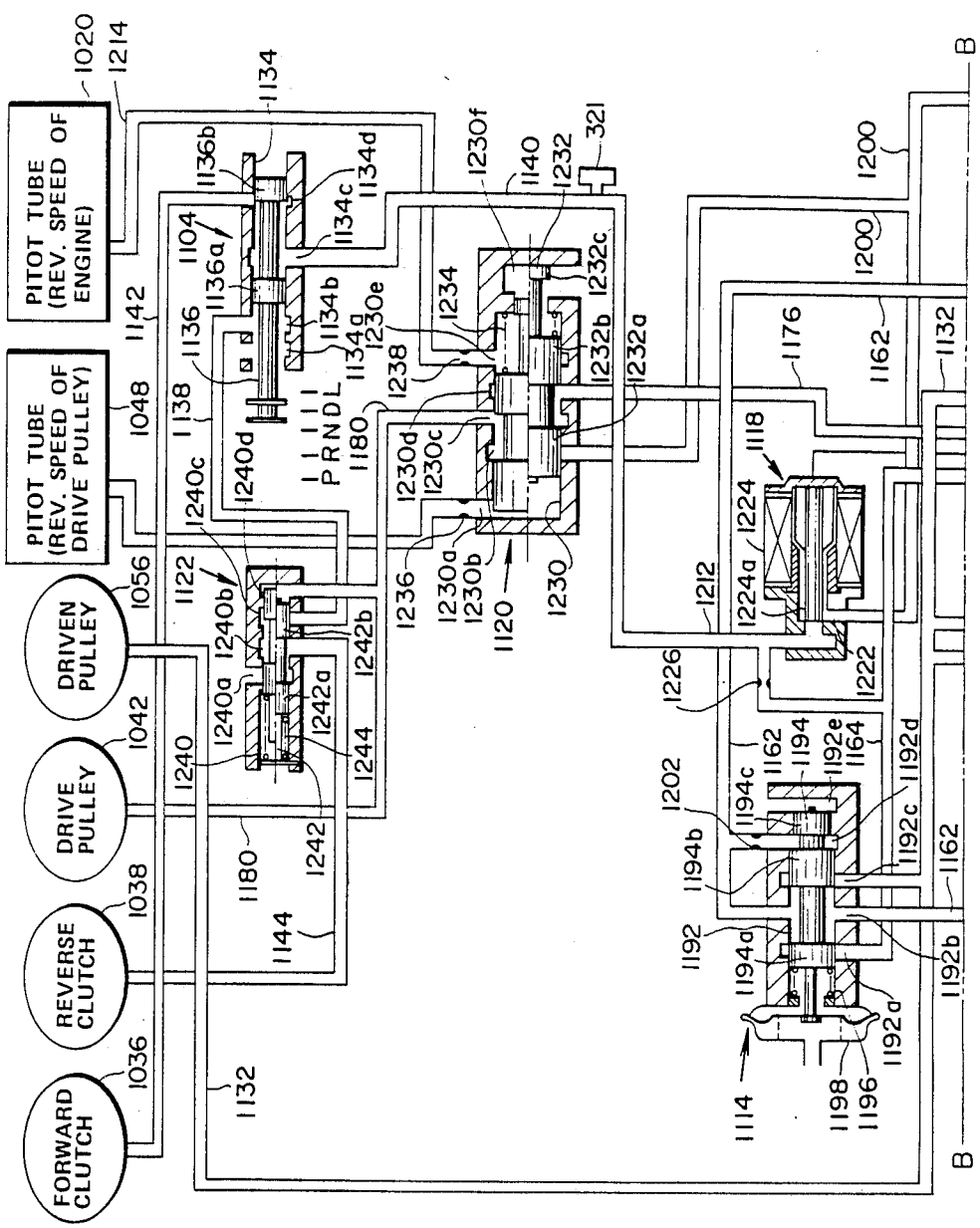

Referring to FIG. 1, an input shaft 1002 is driven by an engine having a throttle valve which opens in degrees. The input shaft 1002 is connectable with a drive pulley 1006 via hydraulic forward clutch 1004 or reverse clutch 1024. The forward clutch 1004 is adapted to be engaged for forward drive, while the reverse clutch 1024 is adapted to be engaged for reverse drive. The forward clutch 1004 has a cylinder chamber 1036, i.e., a clutch engagement chamber, and the reverse clutch 1024 has a cylinder chamber 1038, i.e., a clutch engagement chamber. As shown in FIG. 2A, the forward clutch cylinder chamber 1036 is connected with a manual valve 1104 via a fluid conduit 1142, while the reverse clutch cylinder chamber 1038 is connected with the manual valve 1104 via a fluid conduit 1144, a reverse inhibitor valve 1122 and a fluid conduit 1138. The manual valve 1104 receives a regulated fluid pressure built up in a fluid conduit 1140 and selectively admits the regulated fluid pressure to the forward cylinder chamber 1036 when it is set at "D" (forward drive) position or to the reverse clutch cylinder chamber 1038 when it is set at "R" (reverse drive) position. The fluid conduit 1140 is connected via an orifice 1226 with a throttle fluid pressure circuit 1162 and is formed with a drain opening or port 1222 communicating with a drain circuit 1200. The rate of fluid discharge from the fluid conduit 1140 is controlled by a start adjustment valve 1118 which will be described later.

Referring back to FIG. 1, a torque sensor 321 is installed to detect torque on a drive shaft 1008 disposed on the output side of the forward clutch 1004 and the reverse clutch 1024 and generates an electric voltage indicative of the torque. This torque is referred to as a clutch output torque. The detailed description of FIG.

1 is found in a co-pending U.S. patent application Ser. No. 489,600, filed Apr. 28, 1983, now U.S. Pat. No. 4,579,021 (see FIG. 24 thereof), which has a corresponding European patent application No. 83 104 182.7 (publication No. 0093413, published on Nov. 9, 1983). That portion of the description of this co-pending application which relates to FIG. 24 is hereby incorporated by reference to complete the disclosure of FIG. 1.

Briefly, the continuously variable transmission transmits the rotation of the input shaft 1002 via a drive pulley 1006, a V-belt 1050, and a driven pulley 1051 to output shafts 1076 and 1078 when the forward clutch 1004 or the reverse clutch 1024 is engaged. This continuously variable transmission comprises the input shaft 1002, the forward clutch 1004, the drive pulley 1006, a drive shaft 1008, a fluid pump 1010, a drive gear 1012, a driven gear 1014, a rotary flume 1016, a reservoir 1018, a pitot tube 1020, an auxiliary shaft 1022, the reverse clutch 1024, gears 1026, 1028, 1030, 1032 and 1034, the torque sensor 321, the clutch cylinder chambers 1036 and 1038, a fixed conical disc 1040, a drive pulley cylinder chamber 1042, a movable conical disc 1044, a rotary flume 1046, a fluid reservoir 1047, a pitot tube 1048, the V-belt 1050, the driven pulley 1051, a driven shaft 1052, a fixed conical disc 1054, a driven pulley cylinder chamber 1056, a spring 1057, a movable conical disc 1058, a gear 1060, a ring gear 1062, a differential case 1064, pinion gears 1066 and 1068, a differential 1070, side gears 1072 and 1074, and the output shafts 1076 and 1078.

Referring to FIGS. 2A and 2B, a hydro-electronic control system includes a clutch control system and a shift control system. The clutch control system comprises the fluid pump 1010, a line pressure regulator valve 1102, the throttle valve 1114, the manual valve 1104, the reverse inhibitor valve 1122, the start adjustment valve 1118, and an electronic control unit 1300. The shift control system comprises the fluid pump 1010, the line pressure regulator valve 1102, a shift control valve 1106, a shift motor (a stepper motor) 1110, a shift operating mechanism 1112, a maximum reduction ratio maintaining valve 1120, a lubrication valve 1124, the tank 1130 and the electronic control unit 1300. The detailed description of the illustrated elements in FIGS. 2A and 2B is found the previously mentioned co-pending U.S. patent application Ser. No. 489,600 (see FIGS. 25A and 25B). From comparison of FIGS. 2A and 2B of the present application with FIGS. 25A and 25B of the co-pending application, it will be noted that the clutch control system of the present application is not provided with a valve corresponding to a starting valve 1116 shown in FIG. 25A of the co-pending application. For complete disclosure of the shift control system, a reference is made to another co-pending U.S. patent application Ser. No. 543,838 entitled "CONTROL SYSTEM FOR HYDRAULIC AUTOMATIC CLUTCH," filed Oct. 20, 1983, now U.S. Pat. No. 4,576,265 particularly to FIGS. 2A, 2B, 3, 9(a), 9(b) and 10–21 and the corresponding description. This another co-pending U.S. patent application Ser. No. 543,838 has a corresponding European patent application No. 83 110 546.5, filed Oct. 21, 1983 and it is hereby incorporated by reference. The following description, therefore, relates mainly to the start adjustment valve 1118, the electronic control unit 1300 and a clutch control routine 500 (see FIG. 4).

The start adjustment valve 1118, which is an actuator for controlling clutch transmission capacity, is in the form of a force motor 1224 having a plunger 1224a which is adapted to control the amount of fluid discharge from the fluid conduit 1140 to the drain port 1222. Throttle pressure variable with engine induction manifold vacuum is supplied to the fluid conduit 1140 via the orifice 1226. In inverse proportion to the intensity of electric current passing through the force motor 1224, the rate of fluid discharge from the fluid conduit 1140 varies, so that fluid pressure (start pressure) within the fluid conduit 1140 is regulated by controlling the intensity of electric current passing through the force motor 1224. The intensity of the electric current passing through the force motor 1224 is controlled by the electronic control unit 1300 in the later described manner. The regulated fluid pressure within the oil conduit 1140 is supplied selectively to the forward clutch 1004 or the reverse clutch 1024 in accordance with the position assumed by the manual valve 1104.

Figure 3:
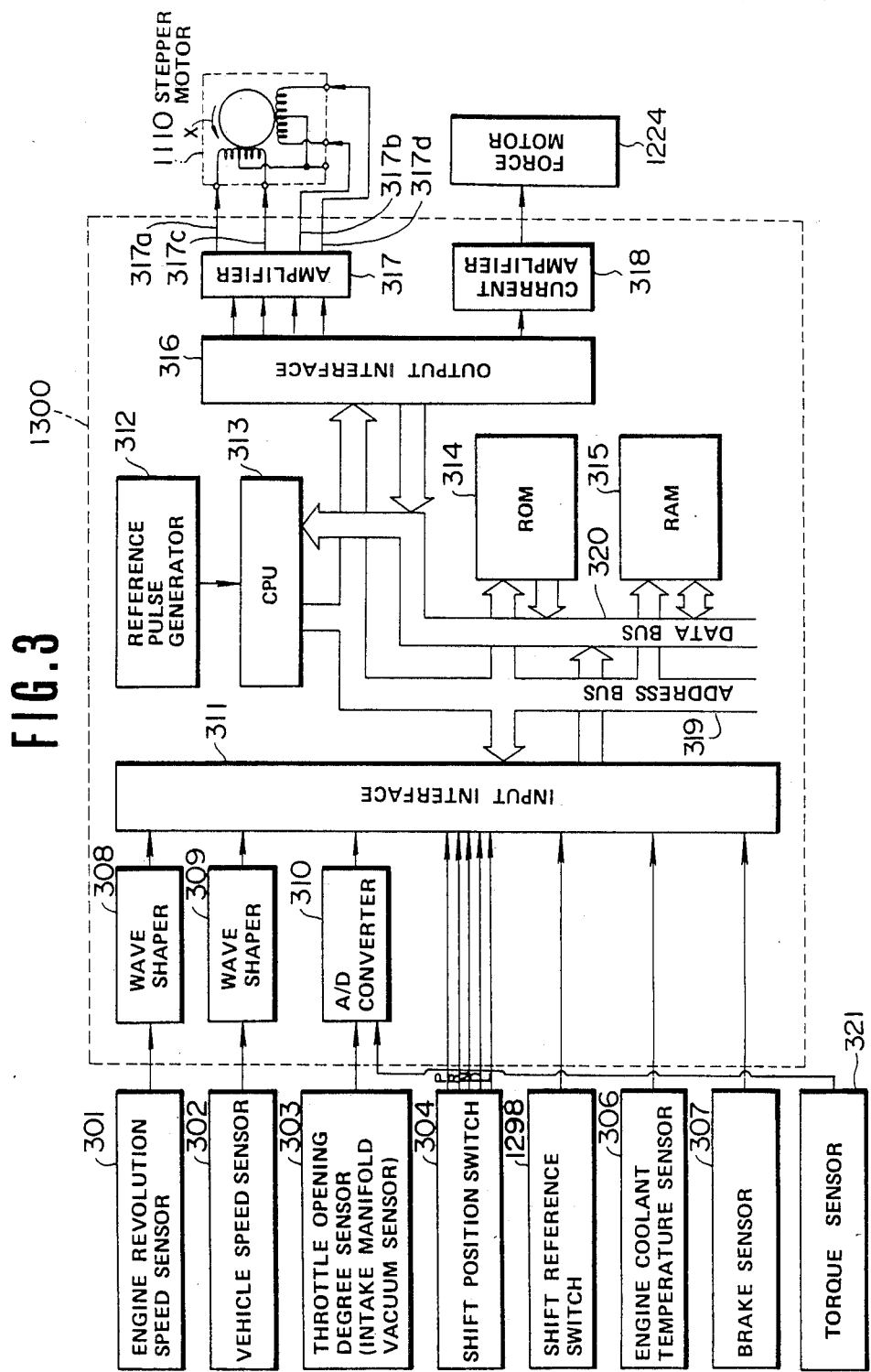
FIG. 3 is a block diagram showing an electronic control unit 1300 shown in FIG. 2B.

Referring now to FIG. 3, an explanation is made regarding the electronic control unit 1300 which contains the shift control routine for controlling actuation of the stepper motor 1110 and the clutch control routine 500 for controlling electric current passing through the force motor 1224.

As shown in FIG. 3, the electronic control unit 1300 receives as inputs thereto electric signals from an engine revolution speed sensor 301, a vehicle speed sensor 302, an engine load detector in the form of a throttle opening degree sensor (or an intake manifold vacuum sensor) 303, a shift position switch 304, a shift reference switch 1298, an engine coolant temperature sensor 306, a brake sensor 307, and the before mentioned torque sensor 321 (a clutch torque detector). The engine revolution speed sensor 301 detects an engine revolution speed by measuring the number of ignition spark pulses of the engine, and the vehicle speed sensor 302 detects a vehicle speed by measuring the revolution of the output shaft of the continuously variable transmission. The throttle opening degree sensor (or intake manifold vacuum sensor) 303 detects the engine throttle opening degree in terms of an electric voltage signal (in the case of the intake manifold vacuum sensor, the intake manifold vacuum is detected in terms of an electric voltage signal). The shift position switch 304 detects which one of range positions, namely, P, N, D, and L, the before mentioned manual valve 1104 assumes. The shift reference switch 1298 is turned on when the rod 1182 of the before mentioned shift operating mechanism 1112 has come to a position corresponding to the largest reduction ratio (the rod 1182 can overstroke such that it can move further beyond the position when the shift reference switch 1298 is turned ON with shift reference switch 1298 kept closed). The engine coolant temperature 306 generates a signal when the engine coolant temperature is lower than a predetermined value. The brake sensor 307 detects whether or not the vehicle brake is used. The torque sensor 321 detects the torque applied to the drive shaft 1008 (i.e., clutch output torque) in terms of an electric voltage. The signals generated by the engine revolution speed sensor 301 and vehicle speed sensor 302 are sent to an input interface 311 after passage through wave shapers 308 and 309, respectively, and the electric voltages from the throttle opening degree sensor (or intake manifold vacuum sensor) 303 and the torque sensor 321 are converted at an A/D converter 310 into digital signals before being sent to the input interface 311. The electronic control unit 1300 includes the input interface 311, a reference pulse generator 312, a CPU (Central Processor Unit) 313, a ROM (Read Only Memory) 314, a RAM (Randam Access Memory) 315, and an output interface 316, which are linked with each other by an address bus 319 and a data bus 320. The reference pulse generator 312 generates a reference pulse which actuates the CPU 313. The ROM 314 stores programs necessary for controlling the stepper motor 1110 and force motor 1224 and data necessary for controlling them. The RAM stores various parameters necessary for processing information from each of the sensors and switches and those necessary for control. Output signals from the electronic control unit 1300 are sent out to the stepper motor 1110 and force motor 1224 via amplifier 317 and electric current controller 318, respectively.

Figure 4:
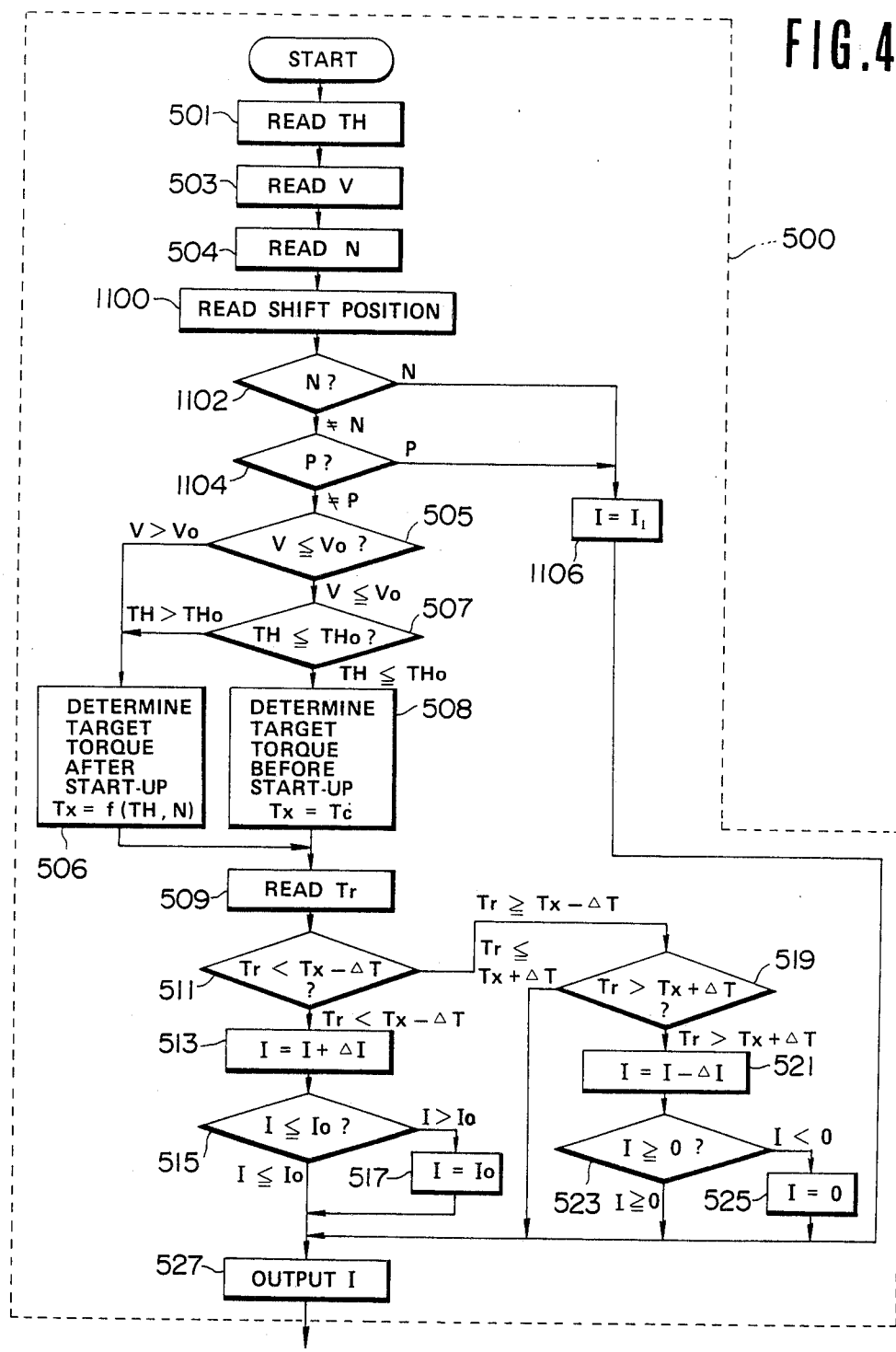
FIG. 4 is a flow chart of a force motor control routine of the control system for the automatic clutch.

Hereinafter, the content of the clutch control routine 500 for the force motor 1224 that is carried out by this control unit 1300 is described. The control unit 1300 controls the stepper motor 1110, too. However, this control is less directly related with the present invention. Thus, a detailed description thereof is omitted. The control routine 500 is shown in FIG. 4. This control routine 500 is executed after a predetermined period of time (i.e., the execution of the following routine is repeated within a short period of time). Describing in connection with the steps, a throttle opening degree TH is read from the throttle opening degree sensor 303 (in step 501), a vehicle speed V is read from the vehicle speed sensor 302 (in step 503), an engine rotational speed N is read from the engine speed sensor 301, and a shift position is read from the shift position switch 304 (in step 1100). Thereafter, determination is made whether or not "N" position is selected (in step 1102), and determination is made whether or not "P" position is selected (in step 1104). If "N" or "P" is selected, the program goes to a step 1106 where the force motor current signal I is given I1 (this value I1 being a predetermined small value which causes generation of start pressure having a magnitude so calibrated as to keep the clutch in a position right before the clutch engagement) and to a step where the force motor 1224 is actuated (in step 527). If neither "N" nor "P" is selected, the program goes to a step 505 where a determination is made whether or not the vehicle speed V is less than a predetermined small value Vo. If V is less than the predetermined value Vo, a determination is made in step 507 whether or not the throttle opening degree TH is less than or equal to a predetermined small value THo. If TH is less than the predetermined small value THo (i.e., in the case when the vehicle is at a standstill with the engine idling) and is ready to begin operator commanded movement, the program goes to a step 508 where a target clutch torque Tx is given a value Tc which corresponds to a creep torque (this value Tc corresponding to a torque produced when the clutch is slightly engaged so as to allow the vehicle to creep). If V is greater than Vo in step 505 or TH is greater than THo in step 507, the program goes to a step 506 where target clutch torque Tx is given a value resulting from arithmetic operation of a predetermined function f(TH, N). This function f(TH, N) provides an optimum torque by arithmetic operation based on the throttle opening degree TH and the engine speed N. (It is possible to prepare a table containing data of engine torque corresponding to various values in TH and N and determine the optimum torque by retrieving this table.) After determining the target clutch torque Tx in step 506 or 508, an actual clutch torque Tr is read from the torque sensor 321. After reading the torque Tr in step 509, the program goes to a step 511 where determination is made whether or not the torque Tr is less than or equal to a target torque lower limit value $Tx-\Delta T$ ($\Delta T$ is a very small value). If Tr is less than $Tx-\Delta T$, a small value $\Delta I$ is added to the force motor current signal I obtained in the previous routine to give a new current signal value I (step 513). Thereafter, determination is made whether or not the electric current signal I is less than or equal to a maximum allowable electric signal Io (in step 515). If I is less than or equal to Io, the program goes to the step 527, while if I is greater than Io, I is given Io (in step 517) and then the program goes to the step 527 where the force motor electric signal I is sent out. If, in step 511, Tr is greater than or equal to $Tx-\Delta T$, a determination is made whether or not the clutch torque Tr is greater than a target torque upper limit value $Tx+\Delta T$ (in step 519). If Tr is less than or equal to $Tx+\Delta T$ (Viz., $Tx-\Delta T \leq Tr \leq Tx+\Delta T$ holds if combined with the decision made by the step 511. That is, the actual torque Tr is disposed between the upper and lower limit values.), the program goes to the step 527 where the electric current signal I obtained in the previous routine is sent out. If, in the step 519, Tr is greater than $Tx+\Delta T$, the force motor electric signal I is decreased by the small value $\Delta I$ and set as a new electric current value I (in step 521). In order to prevent the electric current signal I from becoming negative, a determination is made whether or not I is greater than or equal to zero (in step 523). If I is greater than or equal to zero, the program goes directly to the step 527, while if I is less than zero, the program goes to a step 525 where I is given zero, and then goes to the step 527 where the electric signal I is sent out. As a result of the jobs performed in above mentioned steps, when the clutch torque Tr is less than the target clutch torque lower limit value, the force motor electric current I is increased so as to raise the start pressure and thus transition torque, whereas when the clutch torque Tr is greater than the target torque upper limit value, the force motor electric current I is decreased so as to lower the start pressure and thus transmission torque. According to this control, the clutch torque Tr is always maintained between the target clutch torque upper and lower limit values. The target clutch torque Tx for operation before start-up of the vehicle is set at the value Tc with which the vehicle can run at a small speed (i.e., a creep running state). When, under this condition, the accelerator pedal is depressed for starting the vehicle, the target torque for operation after start-up is determined depending upon an increase in the engine output in the step 506 and the start pressure is increased in accordance with this target torque determined in the step 506, so that the clutch engagement force with which the forward clutch 1004 (or reverse clutch 1024) is engaged is increased gradually, thus enabling the vehicle to start running. Therefore, the above described control provides a stable and smooth start-up operation of the vehicle without engine racing or unintentional starting irrespective of variations in idle engine speed, and it does not cause any shocks upon vehicle starting the to backlash because, under pre-start-up condition, the clutch is slightly engaged to bias the components of the driving system following the clutch in one rotational direction.

Although, the preceding description involves only the present embodiment wherein the clutch is combined with the continuously variable transmission, the present invention is equally applicable to an automatic clutch combined with a step automatic transmission or a manual transmission. Although, in the described embodiment, the automatic clutch employing a hydraulic actuator is used, an automatic clutch employing another type of actuator such as an electromagnetic clutch may be used if it can vary its transmission capacity by controlling electric current supplied thereto.

I claim:

1. A control system for an automatic clutch for a vehicle having an engine, comprising:

means for generating a parameter indicative of a load applied to the engine and generating an engine load indicative signal indicative of the parameter detected;

means for detecting an engine revolution speed of the engine and generating an engine revolution speed indicative signal indicative of the engine revolution speed detected;

means for detecting a vehicle speed of the vehicle and generating a vehicle speed indicative signal indicative of the vehicle speed detected;

means responsive to said engine load indicative signal and said vehicle speed indicative signal for detecting whether the vehicle is in a condition in which the vehicle is ready to begin operator commanded movement and generating a pre-start-up indicative signal when the vehicle is in said condition, said responsive means generating said pre-start-up signal when said vehicle speed indicative signal is not greater than a predetermined vehicle speed value and said load indicative signal is not greater than a predetermined load indicative value;

means for determining a target clutch torque, said determining means being operative in response to the presence of said pre-start-up signal for setting said target clutch torque at a predetermined first torque value and being operative in the absence of said pre-start-up signal for determining a second torque value which is variable in response to said engine load indicative signal and said engine revolution indicative signal and setting said target clutch torque at said second torque value, and generating a target clutch torque signal indicative of said target clutch torque;

means for detecting an actual clutch torque transmitted by the automatic clutch and generating an actual clutch torque indicative signal;

means for comparing said actual clutch torque indicative signal with said target clutch torque indicative signal and generating an electrical signal indicative of the result of said comparison; and means for controlling the engagement of the automatic clutch in response to said electrical signal such that said actual clutch torque indicative signal is brought into a predetermined relationship with said target clutch torque indicative signal.

2. A control system as claimed in claim 1, wherein said predetermined first clutch torque value is a creep torque which has a magnitude large enough to keep the vehicle running at a vehicle speed lower than a predetermined vehicle speed.

3. A control system as claimed in claim 1, wherein said controlling means includes, means for generating a throttle fluid pressure indicative of the engine load, means for establishing a fluid passage for connecting said throttle fluid pressure generating means with the automatic clutch, means for controlling fluid discharge from said fluid passage responsive to said electrical signal so as to provide a regulated fluid pressure variable with said electrical signal, and means for adjusting engagement of the automatic clutch in response to said regulated fluid pressure.

4. In a vehicle having an engine, an automatic transmission, and an automatic clutch disposed between the engine and the automatic transmission so as to deliver torque from the engine to the automatic transmission, the automatic transmission having a plurality of ranges including a parking range, a neutral range and a drive range;

means for detecting a parameter representative of load applied to the engine and generating an engine load indicative signal indicative of the parameter detected;

means for detecting an engine revolution speed of the engine and generating an engine revolution speed indicative signal indicative of the engine revolution speed detected;

means for detecting a vehicle speed of the vehicle and generating a vehicle speed indicative signal indicative of the vehicle speed detected;

means for detecting which of the plurality of ranges the automatic transmission is shifted to and generating a range indicative signal when the automatic transmission is shifted to the drive range;

means responsive to said engine load indicative signal, said vehicle speed indicative signal, and said range indicative signal for determining that the vehicle is in a predetermined condition where the vehicle is ready to start movement under operator control and generating a condition indicative signal indicative of said predetermined condition when said vehicle speed indicative signal is not greater than a predetermined vehicle speed value and said load indicative signal is not greater than a predetermined load indicative value under a condition where said range indicative signal is present;

means for determining a target clutch torque, said determining means setting said target clutch torque at a predetermined first torque value when said condition indicative signal is present and determining a second torque value which is variable in response to said engine load indicative signal and said engine revolution speed indicative signal and setting said target clutch torque at said second torque value when said condition indicative signal is not present, and generating a target clutch torque indicative signal indicative of said target clutch torque;

means for detecting an actual clutch torque transmitted by the automatic clutch and generating an actual clutch torque indicative signal;

means for comparing said actual clutch torque indicative signal with said target clutch torque indicative signal and generating an electrical signal indicative of the result of said comparison;

means for controlling engagement of the automatic clutch in response to said electrical signal such that said actual clutch torque indicative signal is brought into a predetermined relationship with said target clutch torque indicative signal.

* * * * *